United States Patent
Yoo et al.

(10) Patent No.: US 11,695,187 B2
(45) Date of Patent: Jul. 4, 2023

(54) FUNCTIONALIZED SEPARATOR HAVING ZWITTERIONIC COATING AND METHOD OF FABRICATING THEREOF

(71) Applicant: Research & Business Foundation Sungkyunkwan University, Suwon-si (KR)

(72) Inventors: Pil Jin Yoo, Seoul (KR); Ho Seok Park, Hwaseong-si (KR); Duk Joon Kim, Seoul (KR); Jun Hyuk Lee, Suwon-si (KR); Jeong Seok Yeon, Icheon-si (KR); Sung Mo Kang, Busan (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 253 days.

(21) Appl. No.: 16/989,986

(22) Filed: Aug. 11, 2020

(65) Prior Publication Data
US 2021/0242442 A1  Aug. 5, 2021

(30) Foreign Application Priority Data
Jan. 31, 2020 (KR) .......................... 10-2020-0012178

(51) Int. Cl.
*H01M 50/446* (2021.01)
*H01M 50/403* (2021.01)

(52) U.S. Cl.
CPC ....... *H01M 50/446* (2021.01); *H01M 50/403* (2021.01)

(58) Field of Classification Search
None
See application file for complete search history.

(56) References Cited

U.S. PATENT DOCUMENTS

2006/0116479 A1* 6/2006 Lee .................. H01M 8/1039
525/199
2014/0342209 A1* 11/2014 He .................. H01M 10/056
429/101

(Continued)

FOREIGN PATENT DOCUMENTS

JP  2018-130671 A  8/2018
KR  10-2015-0069059 A  6/2015

(Continued)

OTHER PUBLICATIONS

English Language Machine Translation of KR-20210010228-A retrieved from Espacenet (Year: 2021).*

(Continued)

*Primary Examiner* — Ula C Ruddock
*Assistant Examiner* — Thomas H. Parsons
(74) *Attorney, Agent, or Firm* — NSIP Law (57) ABSTRACT

Disclosed is a method for manufacturing a functionalized separator having a zwitterionic coating thereon. The method includes preparing a porous separator; coating a linker on a surface of the porous separator; and chemically reacting zwitterions with the linker such the zwitterions are grafted to the linker on the surface of the separator. The zwitterions grafted to the linker acts as a monolayer to functionalize the surface of the separator. The functionalized separator may disallow elution of polysulfide compound in a lithium-sulfur battery. Further, the functionalized separator may increase ion conductivity of electrolyte of the lithium-sulfur battery and thus ensure high output characteristics.

22 Claims, 9 Drawing Sheets

(56) References Cited

U.S. PATENT DOCUMENTS

2017/0014776 A1* 1/2017 Li ................. B01D 67/0093
2018/0287121 A1* 10/2018 Kim ................. H01M 50/449
2020/0280038 A1* 9/2020 Kim ................. H01M 50/449

FOREIGN PATENT DOCUMENTS

KR  10-2019-0045969 A    5/2019
KR    20210010228 A  *  1/2021

OTHER PUBLICATIONS

Korean Office Action dated Feb. 18, 2021 in counterpart Korean Patent Application No. 10-2020-0012178 (8 pages in Korean).

* cited by examiner

FUNCTIONALIZED SEPARATOR HAVING ZWITTERIONIC COATING AND METHOD OF FABRICATING THEREOF

CROSS REFERENCE TO RELATED APPLICATIONS

This application claims the benefit under 35 USC § 119(a) of Korean Patent Application No. 10-2020-0012178 filed on Jan. 31, 2020 in the Korean Intellectual Property Office, the entire disclosure of which is incorporated herein by reference for all purposes.

BACKGROUND

1. Field

The present disclosure relates to a method for manufacturing a functionalized separator having a zwitterionic coating, and to a functionalized separator having a zwitterionic coating.

Further, the present disclosure relates to use of a functionalized separator having a zwitterionic coating as a separator of a lithium-sulfur battery.

2. Description of Related Art

Lithium-sulfur batteries are promising as next-generation batteries due to their high theoretical capacity. However, For stable battery operation thereof, loss of active material due to elution of a polysulfide compound and thus, reduction of cycle stability should be solved. In order to solve this problem, it is necessary to select a material capable of forming a bond with polysulfide physically and chemically, and to secure a technique for forming an appropriate nano-structure of the selected material to inhibit the polysulfide elution.

In order to prevent the elution of the polysulfide compound occurring during a reduction process of sulfur when operating the lithium-sulfur battery, and the resulting loss of the active material and, thus, formation of an irreversible intermediate layer, an approach in which a positive-electrode active material is trapped in a host material to inhibit diffusion of the polysulfide compound, and an approach in which a solid electrolyte interphase is formed on a lithium negative-electrode to protect the negative-electrode have been attempted. However, in the approach in which the positive-electrode active material is trapped in the host material, the host material tends to gradually become unstable as a cycle is repeated for a longer time. Further, injecting a non-active material into the active material disadvantageously causes characteristics of a high energy density.

Further, in the approach in which the solid electrolyte interphase is formed on the lithium negative-electrode to protect the negative-electrode, stability of the battery may be improved, but a interfacial resistance increases and thus polarization is caused. Thus, a trade-off is inevitable in terms of performance improvement of the battery. Therefore, an approach in which the polysulfide compound elution is inhibited via modification and a structural coating of a separator, rather than the electrode directly affecting battery performance may be used as a valid approach.

As an example of the valid approach, a method of stacking a mixture slurry of a two-dimensional nanosheet material and a binder material on the separator to form a bilayer structure thereon, thereby inhibiting the elution of the polysulfide compound physically and chemically has been reported. However, in this approach, a two-dimensional nanosheet material synthesis requires a complicated process and technique, and an increase in a thickness of the separator brings about a decrease in an energy density.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is completed to overcome the limitations of the conventional approach as introduced above.

Thus, a purpose of the present disclosure is to provide a method for manufacturing a separator, in which a thin zwitterionic coating film is formed on a porous separator substrate, such that a lightness and a thinness as advantages of the conventional separator are maintained, and, at the same time, a modified separator surface via a monolayer surface functionalization using a zwitterionic functional group achieves the polysulfide elution inhibition and an improved ion conductivity effect.

Further, a purpose of the present disclosure provides a method for manufacturing a separator for a lithium-sulfur battery, in which a zwitterionic coating as a monolayer is able to be formed on a separator.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

In a first aspect of the present disclosure, there is provided a method for manufacturing a functionalized separator having a zwitterionic coating thereon, the method comprising: preparing a porous separator; coating a linker on a surface of the porous separator; and chemically reacting zwitterions with the linker such the zwitterions are grafted to the linker on the surface of the separator, wherein the zwitterions grafted to the linker acts as a monolayer to functionalize the surface of the separator.

In one implementation of the first aspect, the porous separator includes a polymer separator.

In one implementation of the first aspect, the porous separator includes an inorganic separator.

In one implementation of the first aspect, the linker contains an amine group.

In one implementation of the first aspect, the linker includes polydopamine or APTES ((3-aminopropyl)triethoxysilane).

In one implementation of the first aspect, a zwitterionic monomer containing the zwitterions reacts with the linker, wherein the zwitterionic monomer containing the zwitterions has a cationic functional group and an anionic functional group at one end thereof and an acrylate functional group at the other end thereof.

In one implementation of the first aspect, the zwitterionic monomer includes [2-(methacryloyloxy)ethyl]dimethyl-(3-sulfopropyl)ammonium hydroxide or 2-methacryloyloxyethyl phosphorylcholine.

In one implementation of the first aspect, the chemically reacting of the zwitterions with the linker includes formation of a bond via an addition reaction between the amine group of the linker and the acrylate functional group of the zwitterionic monomer.

In a second aspect of the present disclosure, there is provided a functionalized separator having a zwitterionic coating thereon, wherein the functionalized separator is manufactured using the method as defined above, wherein the functionalized separator is used as a separator for a lithium-sulfur battery.

In a third aspect of the present disclosure, there is provided a functionalized separator having a zwitterionic coating thereon, wherein the functionalized separator includes a porous separator, wherein zwitterions are coated on a surface of the porous separator, wherein the zwitterionic coating acts as a monolayer to functionalize the surface of the porous separator.

In one implementation of the third aspect, a linker is coated on the surface of the porous separator, and the zwitterions are grafted to the linker on the surface of the porous separator.

In one implementation of the third aspect, the porous separator includes a polymer separator.

In one implementation of the third aspect, the porous separator includes an inorganic separator.

In one implementation of the third aspect, the linker contains an amine group.

In one implementation of the third aspect, the linker includes polydopamine or APTES ((3-aminopropyl)triethoxysilane).

In one implementation of the third aspect, in order that the zwitterions are coated on the surface of the porous separator, a zwitterionic monomer containing the zwitterions reacts with the surface of the porous separator, wherein the zwitterionic monomer containing the zwitterions has a cationic functional group and an anionic functional group at one end thereof and an acrylate functional group at the other end thereof.

In one implementation of the third aspect, in order that the zwitterions are coated on the surface of the porous separator, a zwitterionic monomer containing the zwitterions reacts with the linker coated on the surface of the porous separator, wherein the zwitterionic monomer containing the zwitterions has a cationic functional group and an anionic functional group at one end thereof and an acrylate functional group at the other end thereof.

In one implementation of the third aspect, the zwitterionic monomer includes [2-(methacryloyloxy)ethyl]dimethyl-(3-sulfopropyl)ammonium hydroxide or 2-methacryloyloxyethyl phosphorylcholine.

In one implementation of the third aspect, when the zwitterionic monomer containing the zwitterions reacts with the linker coated on the surface of the porous separator, a bond is formed via an addition reaction between the amine group of the linker and the acrylate functional group of the zwitterionic monomer, such that the zwitterions are grafted onto the linker.

In one implementation of the third aspect, the functionalized separator is used as a separator for a lithium-sulfur battery.

In a fourth aspect of the present disclosure, there is provided a lithium-sulfur battery comprising the functionalized separator as defined above.

Effects in accordance with the present disclosure may be as follows but may not be limited thereto.

In accordance with the present disclosure, the zwitterionic coating film is formed on the commercial porous separator substrate, such that the modified separator surface via the monolayer surface functionalization using the zwitterionic functional group achieves polysulfide elution inhibition and an improved ion conductivity effect of a lithium-sulfur battery electrolyte, thereby to ensures high output characteristics.

Further, in accordance with the present disclosure, polarization of the separator surface due to the introduction of the zwitterions may promote dissociation of ions in the electrolyte. As a result, this is expected to be able to achieve improved ion conductivity and improved battery performance with high output characteristics thereof.

Further, in accordance with the present disclosure, the separator having the functionalized surface using the zwitterions exhibits electrostatic repulsion against the anionic polysulfide compound, thereby to realize a dramatically improved polysulfide elution inhibition action, compared to a typical separator. This may play a key role in improving long-term driving stability of the lithium-sulfur battery.

Furthermore, in accordance with the present disclosure, the separator having the functionalized surface using the zwitterions promotes the dissociation of ions due to a high dielectric constant of the zwitterions, thereby to allow superior electroconductivity of the electrolyte compared to a conventional separator. Further, in accordance with the present disclosure, the charged functional group of the zwitterion induces interaction with the anionic polysulfide compound, thereby to exhibit the effective polysulfide elution inhibition. The high conductivity and excellent polysulfide elution inhibition may contribute to improvement of cycle stability and high output properties of the lithium-sulfur batteries.

In addition to the effects as described above, specific effects in accordance with the present disclosure will be described together with the detailed description for carrying out the disclosure.

DETAILED DESCRIPTIONS

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with the present disclosure, a zwitterionic coating film is formed on a commercial porous separator substrate, such that a modified separator surface via a monolayer surface functionalization using a zwitterionic functional group achieves polysulfide elution inhibition and an improved ion conductivity effect of a lithium-sulfur battery electrolyte, thereby to ensures high output characteristics.

In accordance with the present disclosure, zwitterions are bonded to a porous separator via an additional chemical reaction, such that each functional group forms a chemical bond with a polysulfide compound when a battery operates, and an electrostatic repulsive force generated by a charged functional group effectively prevents polysulfide from penetrating the separator and eluting into a negative-electrode. Further, as polarization of the separator surface increases due to a zwitterionic coating thereon, wettability of the electrolyte may be improved, and at the same time, dissociation and ion conductivity of electrolyte ions at the separator surface may be improved. This may remove the problem of the polysulfide compound elution as the limitation of the conventional lithium-sulfur batteries, and may achieve excellent high-output characteristics of the batteries.

Figure 1A:
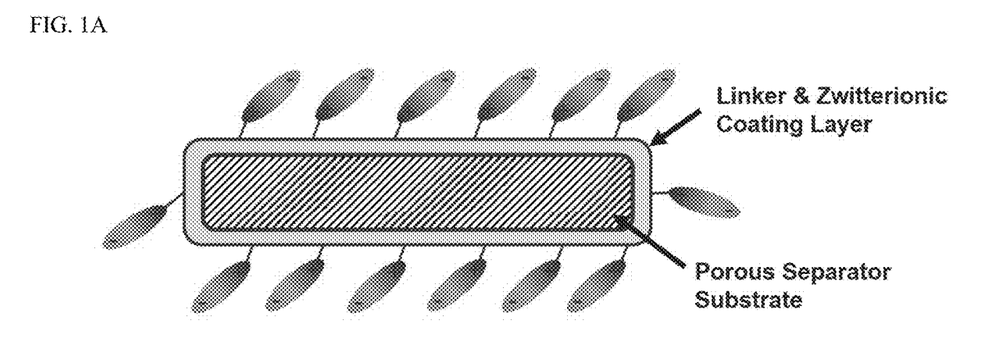
FIG. 1A is a two-dimensional schematic showing that a zwitterionic coating as a monolayer is formed on a porous separator substrate surface to functionalize the separator surface, in accordance with the present disclosure.
Figure 1B:
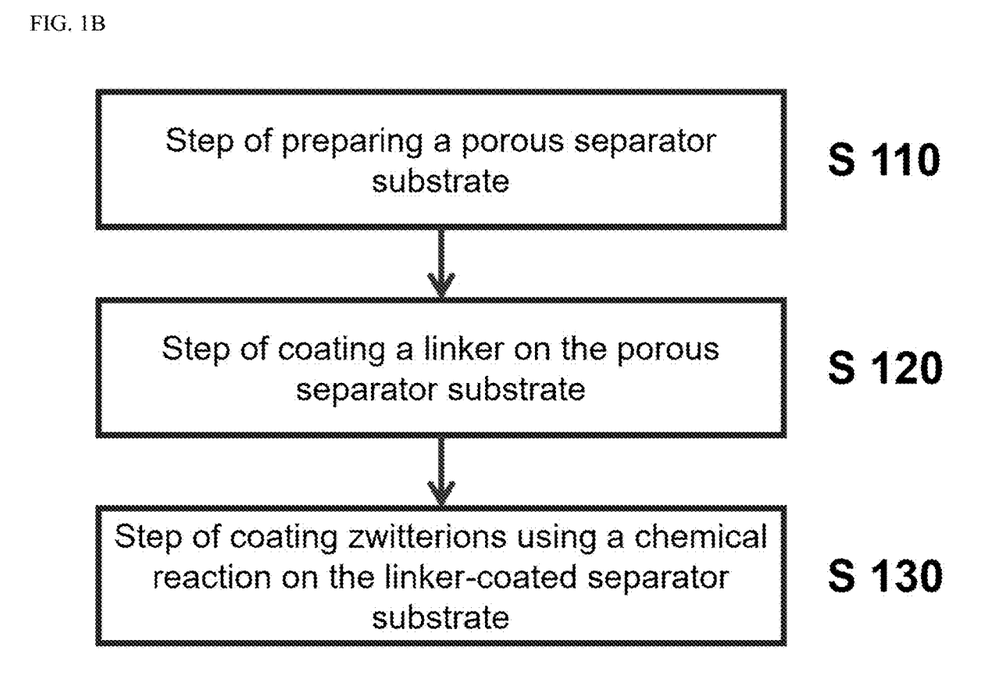
FIG. 1B shows a flowchart of a manufacturing method of a functionalized separator having a zwitterionic coating according to an embodiment of the present disclosure.

FIG. 1A is a two-dimensional schematic showing that a zwitterionic coating as a monolayer is formed on a porous separator substrate surface to functionalize the separator surface, in accordance with the present disclosure. FIG. 1B shows a flowchart of a manufacturing method of a functionalized separator having a zwitterionic coating according to an embodiment of the present disclosure.

A method for manufacturing a functionalized separator having a zwitterionic coating according to an embodiment of the present disclosure may include preparing a porous separator (S 110); coating a linker on a surface of the porous separator (S 120); and grafting zwitterions onto the linker on the surface of the separator via a reaction thereof with the linker (S 130).

In step S 110, the porous separator is prepared. The porous separator may be an organic or inorganic separator. A polymer separator may be used as the porous separator made of an organic material. In particular, a polyolefin-based separator may be used as the polymer separator. For example, a polyethylene separator may be used as the polyolefin-based separator. The inorganic porous separator, may include, for example, a glass fiber separator.

In step S 120, the linker is coated on a surface of the porous separator. It is preferred that the linker is coated on the surface of the porous separator, and a material containing an amine group is used as the linker. Polydopamine or (3-aminopropyl)triethoxysilane (APTES) may be used as an example of the linker. In another example, without using the linker, a zwitterionic compound may be used alone, depending on a chemical structure of the zwitterionic compound.

In step S 130, zwitterions are grafted on the linker on the separator surface using a reaction thereof with the linker.

A zwitterionic monomer containing the zwitterions may have a cationic functional group and an anionic functional group at one end thereof, and an acrylate functional group at the other end thereof. An example of the zwitterionic monomer may include [2-(methacryloyloxy)ethyl]dimethyl-(3-sulfopropyl)ammonium hydroxide or 2-methacryloyloxyethyl phosphorylcholine.

In step S 130, the zwitterions are grafted on the linker via formation of a bond using an addition reaction between the amine group of the linker and the acrylate functional group of the zwitterionic monomer. The binding via the addition reaction is made under 0.5 to 0.7% of triethylamine catalyst condition in 70% aqueous ethanol solution. A reaction temperature is in a range of 70 to 100° C., and takes about 24 hours.

In this way, a functionalized separator having a zwitterionic coating is produced via steps S 110 to S 130 as described above. In the functionalized separator having the zwitterionic coating, the zwitterion-based functionalized monolayer is formed on the surface of the porous separator. This functionalized separator may be used as a separator for lithium-sulfur batteries.

The manufacturing method of the functionalized separator having the zwitterionic coating according to an embodiment of the present disclosure has been described above. Hereinafter, the functionalized separator having the zwitterionic coating will be described. Repetitive descriptions of portions overlapping with those described above will be omitted.

In the functionalized separator having the zwitterionic coating according to an embodiment of the present disclosure, the zwitterions are coated on the surface of the porous separator as shown in FIG. 1A. In this connection, the zwitterionic monolayer is formed on the surface of the porous separator to functionalize the surface of the separator.

The zwitterions may be grafted the linker on the surface of the porous separator. In another example, although not shown, the zwitterions may be directly grafted on the surface of the porous separator alone, depending on the chemical structure of the zwitterionic compound, without using the linker.

The porous separator may include the polymer separator, especially, the polyolefin-based separator. Alternatively, the porous separator may include the inorganic separator.

The linker may contain the amine group. An example of the material containing the amine group includes polydopamine or (3-aminopropyl)triethoxysilane (APTES).

It is preferable that the zwitterionic monomer containing the zwitterions may have a cationic functional group and an anionic functional group at one end thereof, and an acrylate functional group at the other end thereof. An example of the zwitterionic monomer may include [2-(methacryloyloxy)ethyl]dimethyl-(3-sulfopropyl)ammonium hydroxide or 2-methacryloyloxyethyl phosphorylcholine.

The coating is formed via formation of a bond using an addition reaction between the amine group of the linker and the acrylate functional group of the zwitterionic monomer.

In the functionalized separator having the zwitterionic coating according to an embodiment of the present disclosure as prepared, the zwitterions based thin monolayer may be formed on the porous substrate surface, as shown in FIG. 1A, thereby to functionalize the surface of the porous substrate. The zwitterions do not fill pores of the porous substrate, but, rather, porous properties of the separator is maintained.

Hereinafter, the present disclosure will be further described along with specific Examples.

Example 1

Example 1 is an example of zwitterions-based surface functionalization. In this Example, polydopamine as the linker is coated on a commercially available polymeric polyolefin-based separator, and then zwitterions are grafted on the linker layer on the surface of the separator, thereby to realize the surface functionalization.

Figure 2:
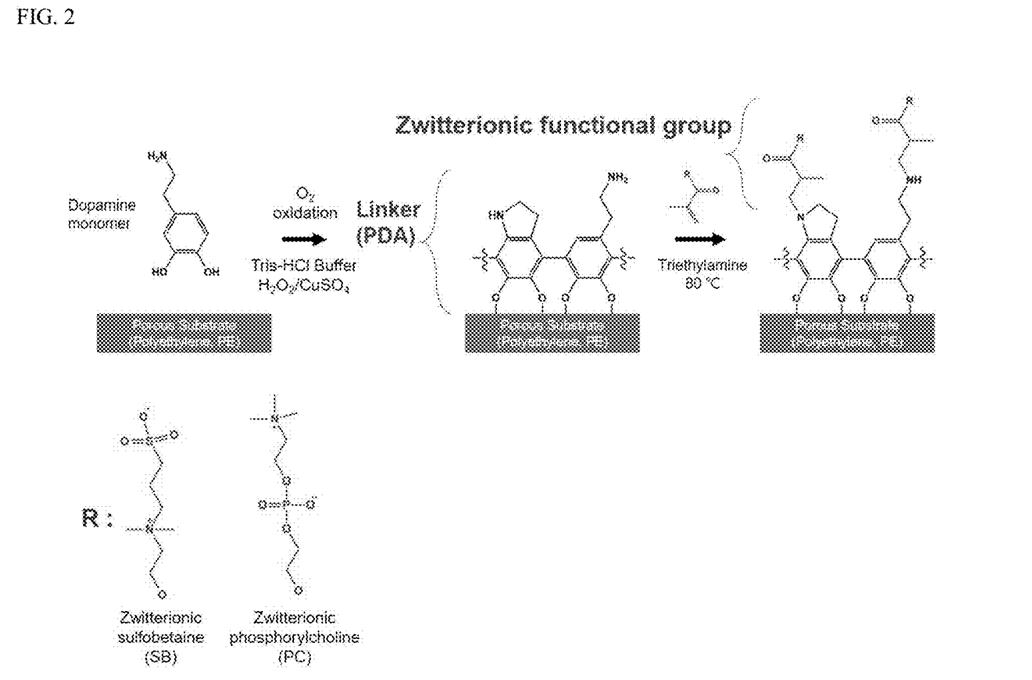
FIG. 2 shows a schematic process in which both of sulfobetaine or phosphorylcholine zwitterions, and polydopamine are coated on a porous polymer substrate, according to Example 1 of the present disclosure.

FIG. 2 shows a schematic process in which both of sulfobetaine or phosphorylcholine zwitterions, and polydopamine are coated on a porous polymer substrate, according to Example 1 of the present disclosure. In this connection, the polymer porous substrate is made of polyethylene (PE). Sulfobetaine has both $N^+$ and $SO_3^-$ functional groups. Phosphorylcholine has $PO_4^-$ and $N^+$ functional groups.

First, dopamine hydrochloride was oxidatively polymerized using a solution process under an oxygen condition to form a polydopamine coating layer on the porous substrate. Subsequently, a sulfobetaine or phosphorylcholine zwitterionic monomer having an acrylate functional group formed a bond with the linker using an addition reaction between the amine group of the linker and the acrylate functional group of the zwitterionic monomer under a triethylamine catalyst. Thus, the zwitterions were grafted on the linker.

The commercially available polymeric polyolefin-based separator was a polyethylene separator from Asahi Kasei Corporation, and had a thickness of 16 μm and a porous property of 41%. For the sulfobetaine zwitterionic coating, a monomer of a compound name [2-(methacryloyloxy)ethyl]dimethyl-(3-sulfopropyl)ammonium hydroxide was used. The monomer has a sulfobetaine (SB) functional group having a cationic $N^+$ functional group and anionic $SO_3^-$ functional group at one end thereof, and a reactive acrylate functional group at the other end thereof. For the phosphorylcholine zwitterionic coating, a monomer of 2-methacryloyloxyethyl phosphorylcholine was used. This monomer has a phosphorylcholine (PC) functional group having anionic $PO_4^-$ and cationic $N^+$ functional groups at one end thereof, and a reactive acrylate functional group at the other end thereof.

The polydopamine coating was formed on the separator by dissolving dopamine monomers in a 30% water/ethanol solution at a concentration of 2 mg/mL, and then causing a polymerization reaction via a solution process for 24 hours at room temperature. During the reaction, pH was adjusted to 8.5 using a tris-HCl buffer solution to which 5 mM copper sulfate and 19.6 mM hydrogen peroxide were added.

The zwitterions were grafted on the linker layer on the separator surface via formation of a bond using an addition reaction between the amine group of the polydopamine structure and the acrylate functional group of the sulfobetaine or phosphorylcholine. The reaction was carried out at 100 mM zwitterionic monomer concentration, at 80° C. and for 24 hours in a 70% ethanol aqueous solution in a 0.6% triethylamine catalyst condition.

After each of the coating process and the grafting process, unreacted residues were washed with acetone, ethanol and distilled water. After a final washing process, the separator sample having the zwitterionic coating was dried in a vacuum oven at 70° C.

For a test, separator samples were obtained as follows: the conventional separator and the separator coated with the polydopamine were defined as a control, and the separator coated with the polydopamine/sulfobetaine or phosphorylcholine zwitterions was defined as an experimental group. Those are shown in the drawings.

Figure 3:
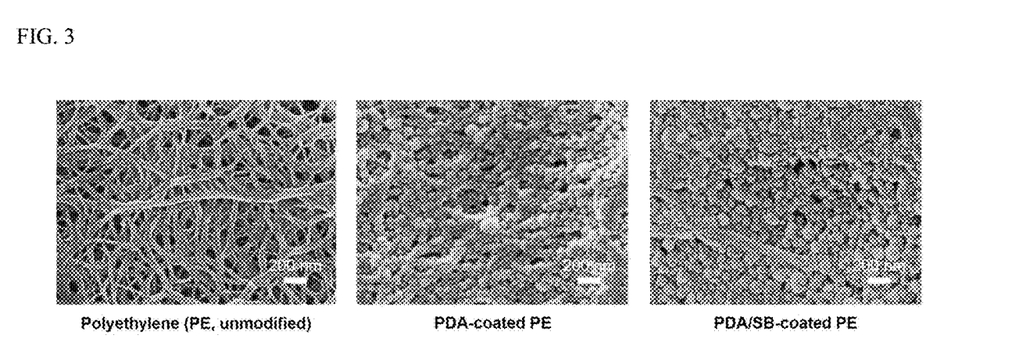
FIG. 3 shows a scanning electron microscope image of each of separator samples (left: conventional separator, middle: separator coated with polydopamine, right: separator coated with polydopamine, and sulfobetaine zwitterions).

FIG. 3 shows a scanning electron microscope image of each of separator samples (left: conventional separator, middle: separator coated with polydopamine, right: separator coated with polydopamine, and sulfobetaine zwitterions).

It may be identified from a result of observing a front face of each of the separator samples using SEM, that the polydopamine is formed and coated as nanoparticles on the separator substrate, while the separator sample in which the zwitterions are grafted onto the polydopamine on the separator substrate has substantially the same morphology as that of the unmodified sample. This may indicate that the zwitterionic coating as the monolayer was formed on the separator substrate while maintaining fine nanopores in the separator substrate.

Figure 4:
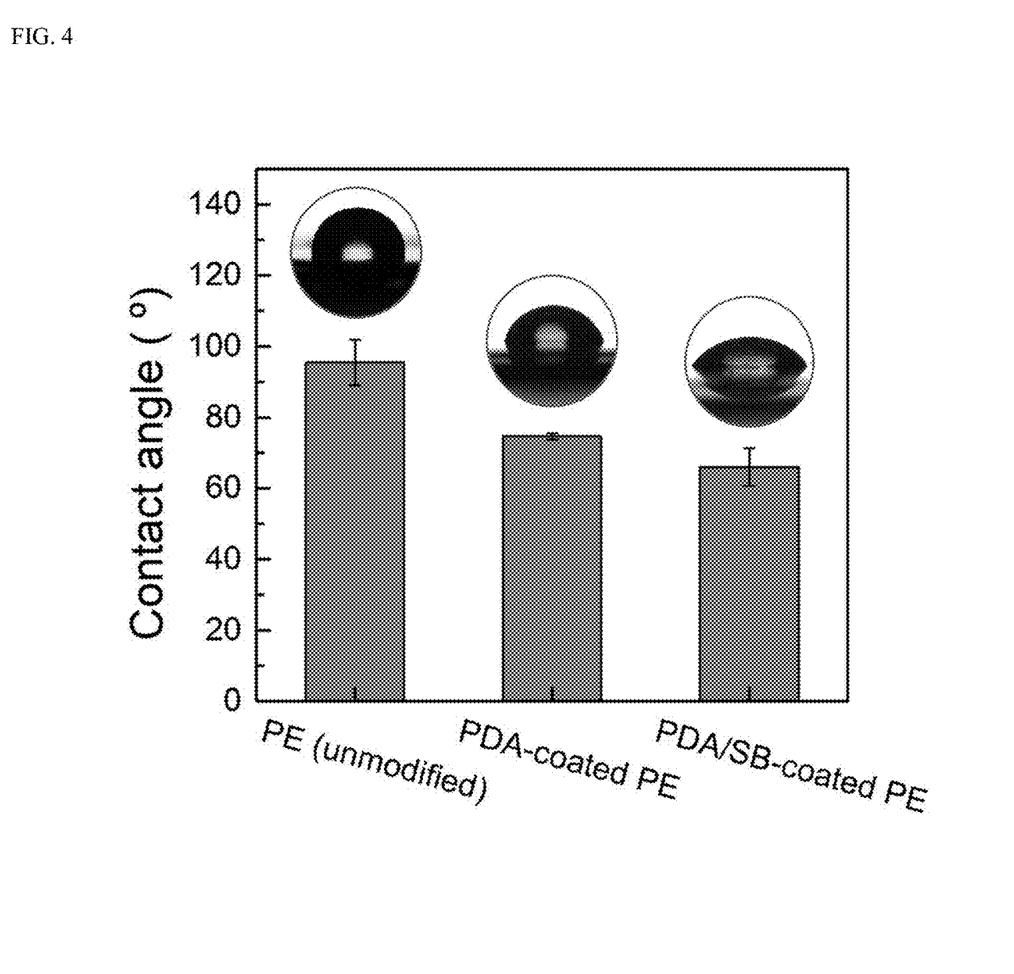
FIG. 4 shows contact angle data of each of the separator samples.

FIG. 4 shows contact angle data of each of the separator samples.

In this connection, a dropped solvent was water. A tendency in which the contact angle decreases as the water as a polar solvent contacts the separator sample coated with the polydopamine, and sulfobetaine zwitterions indicates that a surface of the separator coated with the polydopamine, and sulfobetaine zwitterions has the most polar property.

Figure 5:
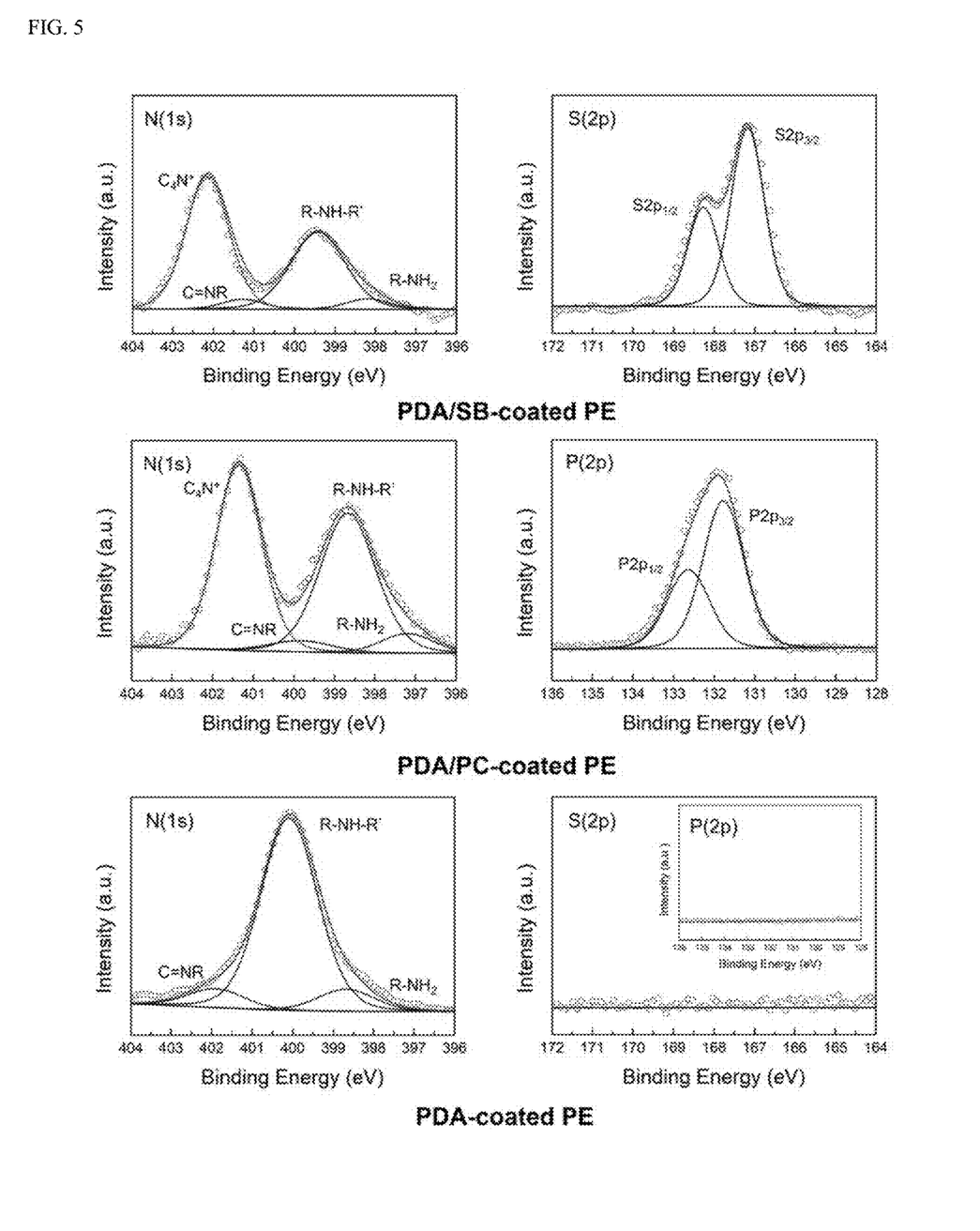
FIG. 5 shows XPS (X-ray photoelectron spectroscopy) data of a polydopamine coated separator (bottom row), a polydopamine/sulfobetaine zwitterions coated separator (top row), and a polydopamine/phosphorylcholine zwitterions coated separator (middle row), based on S, N, and P elements.

FIG. 5 shows XPS (X-ray photoelectron spectroscopy) data of a polydopamine coated separator (bottom row: N, S, P), a polydopamine/sulfobetaine zwitterions coated separator (top row: N, S), and a polydopamine/phosphorylcholine zwitterions coated separator (middle row: N, P), based on S, N, and P elements.

It was identified from the XPS (X-ray photoelectron spectroscopy) data, that N, S, and P element peaks present in the zwitterions appeared. Further, it was identified from the XPS data that a peak shift of the amine functional group, generation of a $C_4N^+$ functional group peak occurred. Moreover, it was identified based on sulfonate and phosphate functional group peaks of the XPS data that the chemical bond between the amine functional group of dopamine and the zwitterionic monomer was successfully achieved.

In the sample (PDA-coated PE) coated only with polydopamine, three peaks appearing at about 400 eV may be due to three different molecular structures formed based on a mechanism of dopamine oxidation polymerization. There were no peaks related to the S and P elements because there were no S and P elements in a structure of the sample (PDA-coated PE).

However, in the polydopamine/sulfobetaine zwitterions coated separator, and the polydopamine/phosphorylcholine zwitterions coated separator where the zwitterions were chemically bonded to the separator, an existing peak shifted by −0.5 eV to −1.2 eV, and, thus, a new peak occurred at 401 eV or greater. This may be due to a $C_4N^+$ functional group of the zwitterions. It was identified that when the phosphorylcholine zwitterionic coating was formed on the liker layer, the P element peak occurred, and when the sulfobetaine zwitterionic coating was formed thereon, the S element peak occurred. In this connection, the two peaks related to the S and P elements may be related to a phenomenon (spin-orbital splitting) that occurs when analyzing p-orbital electrons. This indicates that zwitterions were successfully combined thereto because the above data is consistent with a difference between energy exhibited by the sulfonate and phosphate structures.

Figure 6:
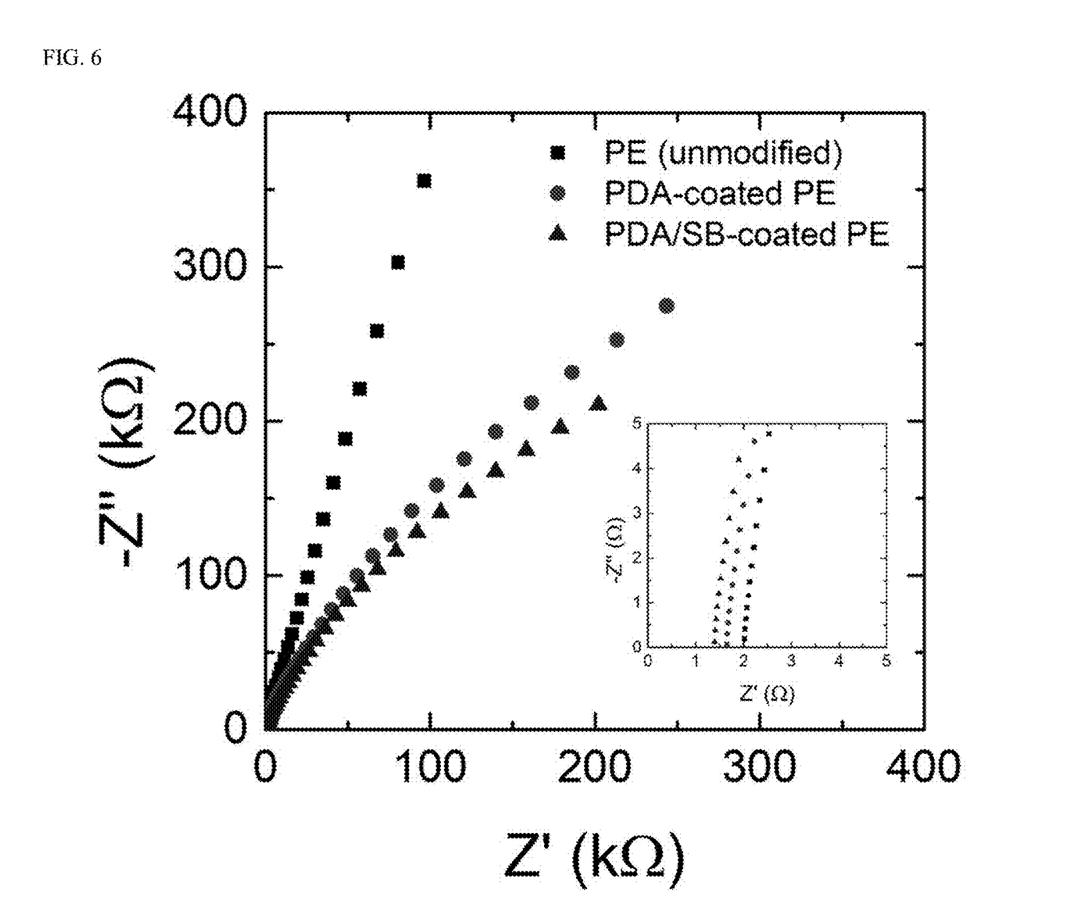
FIG. 6 shows a Nyquist plot graph of an electrolyte resistance (x intercept) for each of the separator samples.

FIG. 6 shows a Nyquist plot graph showing an electrolyte resistance (x intercept) for each of the separator samples.

In FIG. 6, black, red and blue colors respectively refer to Nyquist plots at room temperature as obtained via electrochemical impedance spectroscopy (EIS) of first to third symmetric coin cells (CR2032). In this connection, in the first to third symmetric coin cells, an electrolyte was impregnated into a polyethylene based separator, a polydopamine coated separator, and a polydopamine/sulfobetaine zwitterion coated separator, respectively, which in turn were interposed between positive and negative electrodes made of stainless steel. Regarding a composition of the electrolyte as used, 1.0 M LiTFSI and 0.1 M $LiNO_3$ as a salt were added into a mixed solvent of dioxolane/dimethoxyethane=1:1 v/v.

As shown in FIG. 6, it may be identified based on the result of measuring the coin cell resistance at room temperature via the EIS, that when using the conventional separator, the resistance was 2.03Ω; and when using the separator coated with polydopamine, the resistance was 1.65Ω; and when the separator coated with polydopamine and sulfobetaine zwitterions was used, the resistance was 1.40Ω, which was the lowest resistance among the tree samples.

When data are connected to each other to form a line, a value of an X intercept (a point of a X axis meeting with the line) indicates a bulk resistance value inside the cell. It was identified that the smaller the value of the X intercept, the greater conductivity (ionic conductivity) of a charge carrier. Therefore, the separator coated with polydopamine and sulfobetaine zwitterions exhibited the lowest bulk resistance, so that the ionic conductivity was the highest. The ionic conductivity at room temperature calculated based on the electrolyte resistance value was 0.830 mS/cm when using the conventional separator. The ionic conductivity at room temperature calculated based on the electrolyte resistance value was 1.02 mS/cm when using the separator coated with polydopamine. When the separator coated with polydopamine/sulfobetaine zwitterion was used, the ionic conductivity at room temperature calculated based on the electrolyte resistance value 1.20 mS/cm which was higher than those of the control.

In the lithium-sulfur battery operation experiment, a positive electrode was embodied as a sulfur electrode, and a negative-electrode was embodied as a lithium electrode. Each of the separators was impregnated with the electrolyte to prepare each coin cell (CR2032). A control and an experimental group of the separator were used in the same manner as in the above test. Regarding a composition of the electrolyte as used, 1.0 M LiTFSI and 0.1 M $LiNO_3$ as a salt were added into a mixed solvent of dioxolane/dimethoxyethane=1:1 v/v.

Figure 7:
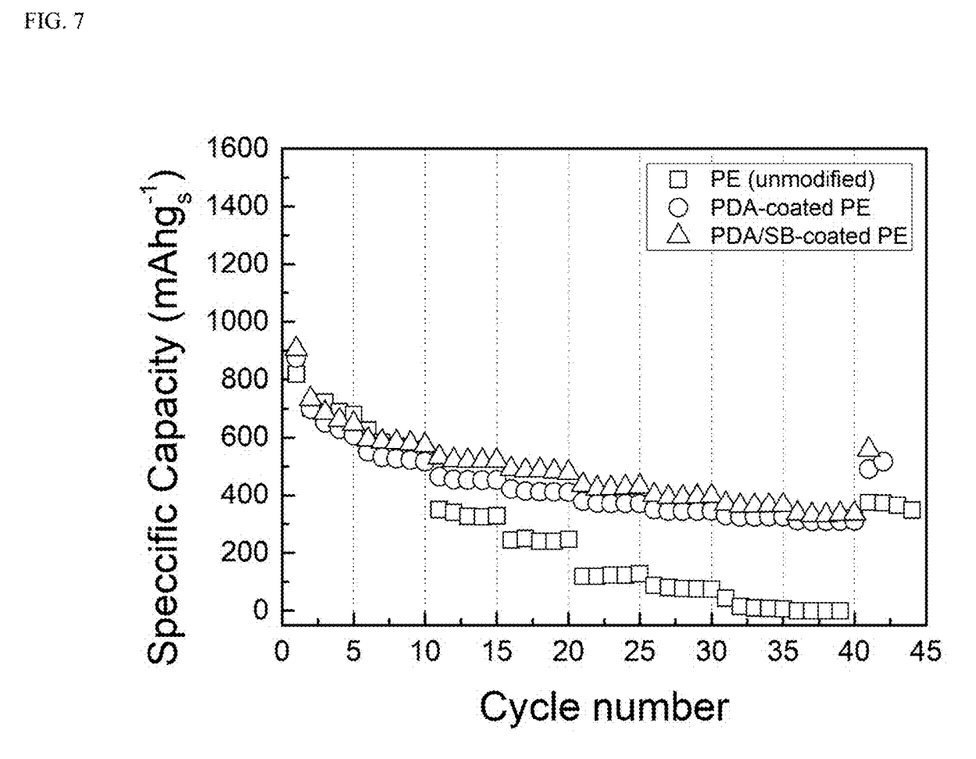
FIG. 7 shows a rate test result of a lithium-sulfur battery having each of the separator samples.

FIG. 7 shows a result of a rate test of a lithium-sulfur battery having each separator sample.

In FIG. 7, when using the conventional separator at a high rate (5C, 36 to 40 cycles) during a C-rate test, a capacity was lowered from an initial capacity (818 $mAhg_s^{-1}$) to 43 $mAhg_s^{-1}$ by 95%. When using the separator coated only with polydopamine at a high rate (5C, 36 to 40 cycles) during a C-rate test, a capacity was lowered from an initial capacity (875 $mAhg_s^{-1}$) to 328 $mAhg_s^{-1}$ by 63%. When using the separator coated with polydopamine and zwitterions at a high rate (5C, 36 to 40 cycles) during a C-rate test, a capacity was lowered from an initial capacity (905 $mAhg_s^{-1}$) to 369 $mAhg_s^{-1}$ by 60%. Thus, the capacity characteristics of the experimental group, that is, the separator coated with polydopamine and zwitterions was superior to those of a first control, that is, the conventional separator, and a second control, that is, the polydopamine only coated separator. That is, when using the first control, that is, the conventional separator at a high rate (5C, 36 to 40 cycles) during a C-rate test, a capacity was lowered from an initial capacity (818 $mAhg_s^{-1}$) to 43 $mAhg_s^{-1}$ by 95%.

When using the second control, that is, the separator coated only with polydopamine at a high rate (5C, 36 to 40 cycles) during a C-rate test, a capacity was lowered from an initial capacity (875 mAhg$_s^{-1}$) to 328 mAhg$_s^{-1}$ by 63%. When using the experimental group, that is, the separator coated with polydopamine and zwitterions at a high rate (5C, 36 to 40 cycles) during a C-rate test, a capacity was lowered from an initial capacity (905 mAhg$_s^{-1}$) to 369 mAhg$_s^{-1}$ by 60%. When a bottleneck occurs in an ions conduction process at a high rate, the capacity characteristic may not be realized to a maximum level. Thus, when using the experimental group, excellent capacity characteristic was realized even at the high rate due to the high electrical characteristic thereof.

Figure 8:
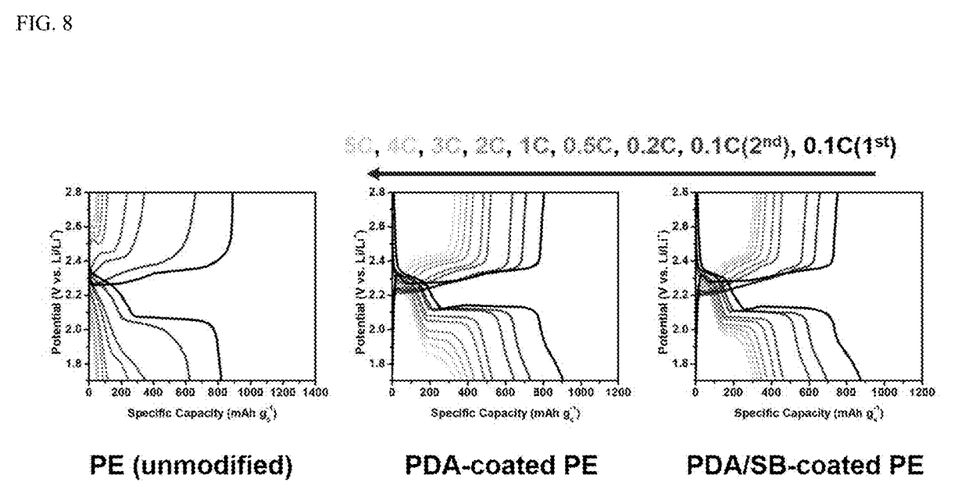
FIG. 8 shows a charge and discharge voltage curve graph of a lithium-sulfur battery having each of the separator samples.

FIG. 8 shows a charge and discharge voltage curve graph of a lithium-sulfur battery having each of the separator samples.

It was identified based on the charge and discharge voltage curve of FIG. 8, that, compared to the conventional separator (unmodified) and the polydopamine-coated separator (PDA-coated PE), in the separator coated with polydopamine/zwitterion (PDA/SB-coated PE), a second plateau appearing at an operating voltage of about 1.95 to 2.15 V during a discharge process was maintained reliably. This indicates that the separator coated with polydopamine/zwitterion (PDA/SB-coated PE) has an excellent function to inhibit the elution of the polysulfide. In this connection, black, red, green, orange colors, etc., from right to left in this order respectively refer to the charge and discharge voltage curves at 0.1C (1st cycle), 0.1C (2nd cycle), 0.2C, 0.5C, 1C, 2C, 3C, 4C, and 5C rates. The curve exhibits unique electrochemical properties of sulfur (S). In the separator coated with polydopamine/zwitterion (PDA/SB-coated PE), the second plateau is well maintained at the high rate, and, at the same time, the capacity does not decrease rapidly as the number of the cycles increases. This may indicate that a shuttle phenomenon in which sulfur is converted to polysulfide which in turn passes through the separator is successfully inhibited. In the conventional separator as the first control, the inhibition effect of the polysulfide elution was not exhibited. Thus, as the cycle progresses, the active material, that is, the sulfur is converted into a soluble polysulfide compound which in turn passes through the separator, and then moves to the negative-electrode, and then is oxidized, thereby forming irreversible lithium sulfide (Li$_2$S) and rapidly decreasing the capacity of the battery. Finally, the second plateau disappears due to loss of the active material.

Example 2

Example 2 is another example of zwitterion-based surface functionalization. In this Example, a commercially available inorganic-based glass fiber porous substrate was pre-coated with APTES ((3-aminopropyl)triethoxysilane)), and then phosphorylcholine zwitterions were grafted to the APTES layer to functionalize the separator surface.

Figure 9:
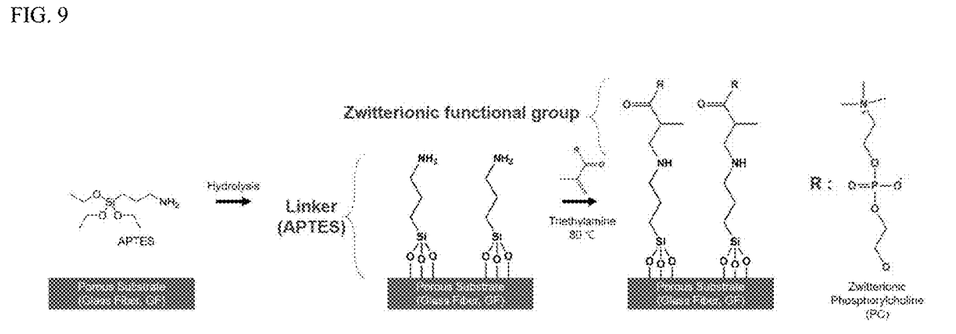
FIG. 9 shows a schematic diagram of a process in which both of phosphorylcholine zwitterions and APTES are coated on an inorganic porous substrate, according to Example 2 of the present disclosure.

FIG. 9 shows a schematic diagram of a process in which both of phosphorylcholine zwitterions and APTES are coated on an inorganic porous substrate, according to Present Example 2 of the present disclosure.

When both of APTES and an inorganic porous substrate was added to a solution containing water, APTES was hydrolyzed and coated on the porous substrate. Subsequently, the zwitterionic monomer having an acrylate group was chemically bonded to the amine group via an addition reaction at a high temperature under triethylamine catalyst.

In this connection, the inorganic porous substrate as used was a glass fiber (GF) separator embodied as a Whatman™ glass microfiber filter product. A compound name of the zwitterionic monomer as used was 2-methacryloyloxyethyl phosphorylcholine.

In the APTES coating process on the separator, a concentration of APTES in a solution in which water and ethanol were mixed with each other in a volume ratio of 1:1 was controlled to 4 wt %. Then, the APTES was hydrolyzed, and then coated on the GF separator at 70° C. for 24 hours.

The zwitterions were grafted on the linker layer on the separator surface via formation of a bond using an addition reaction between the amine group of the APTES structure and the acrylate functional group of the phosphorylcholine. The reaction was carried out at 20 mM zwitterionic monomer concentration, at 80° C. and for 24 hours in a 70% ethanol aqueous solution in a 0.6% triethylamine catalyst condition.

After each of the coating process and the grafting process, unreacted residues were washed with acetone, ethanol and distilled water. After a final washing process, the separator sample having the zwitterionic coating was dried in a vacuum oven at 70° C.

For a test, separator samples were obtained as follows: the conventional separator, that is, the glass fiber as a first control (unmodified), and the separator coated with the APTES were defined as a second control, and the separator coated with the APTES/phosphorylcholine zwitterions was defined as an experimental group. Those are shown in the drawings.

Figure 10:
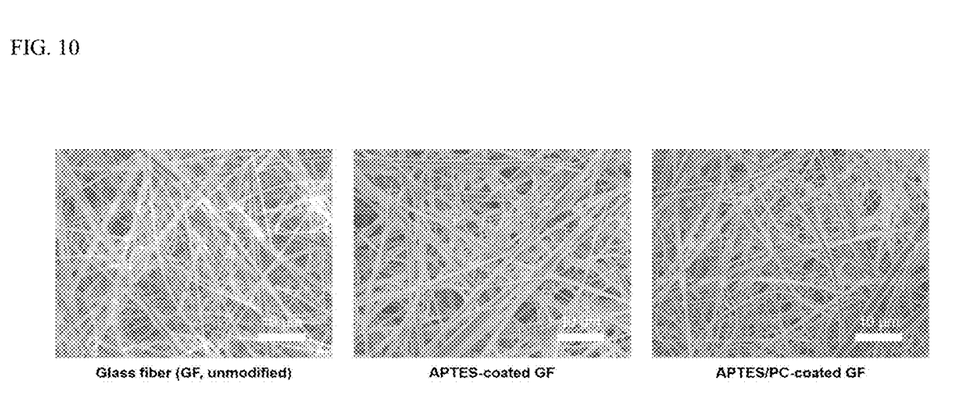
FIG. 10 shows a scanning electron microscope image of each of separator samples (left: glass fiber, middle: APTES coated separator, right: APTES/phosphorylcholine zwitterions coated separator).

FIG. 10 shows a scanning electron microscope image of each of separator samples (left: glass fiber, middle: APTES coated separator, right: APTES/phosphorylcholine zwitterions coated separator).

It may be identified from a result of observing a front face of each of the separator samples using SEM, that the SEM images of the two controls and the experimental group have substantially the same morphology. This indicates that the APTES coating is quite thin, and the zwitterionic coating is formed as a monolayer.

Figure 11:
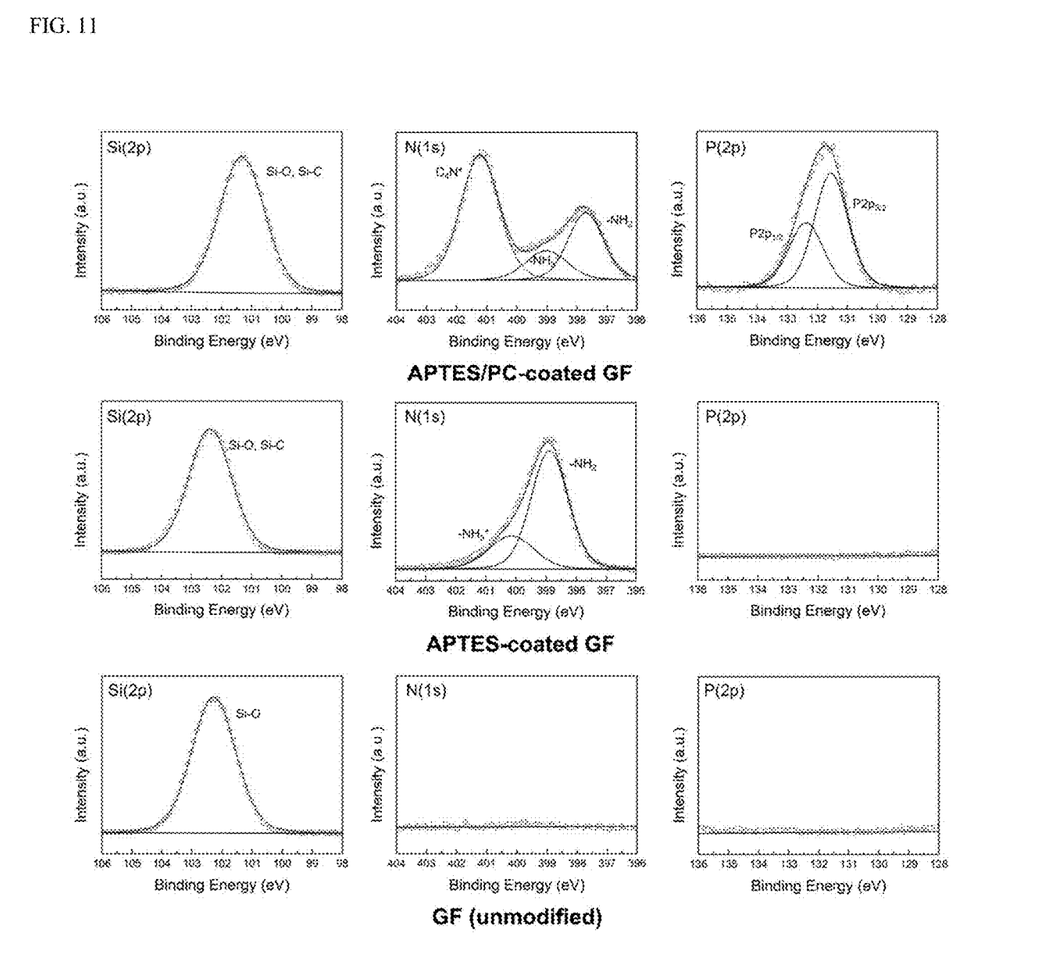
FIG. 11 shows XPS (X-ray photoelectron spectroscopy) data of each of separator samples (glass fiber (bottom row), APTES coated glass fiber (middle row), and APTES/phosphorylcholine zwitterions coated glass fiber (top row)) based on Si, N, and P elements.

FIG. 11 shows XPS (X-ray photoelectron spectroscopy) data of each of separator samples (glass fiber (bottom row: Si, N, P), APTES coated glass fiber (middle row: Si, N, P), and APTES/phosphorylcholine zwitterions coated glass fiber (top row: Si, N, P) based on Si, N, and P elements.

It was identified that in the GF separator having a SiO$_2$ structure, N and P peaks did not appear, and in the separator coated with APTES, a N peak occurred due to the amine group of APTES. In this connection, the coated APTES has NH$_2$ and NH$_3^+$ functional groups, so the two peaks, that is, Si, and N peaks occurred. Further, in the separator coated with APTES/phosphorylcholine zwitterion, the chemical binding of zwitterions to the linker was identified based on a shift of an existing peak, occurrence of a new C$_4$N$^+$ peak, and occurrence of a P peak in the Si and N data. Further, it was identified that zwitterion was successfully bonded to the linker due to peak splitting occurring in a phosphate functional group.

The above descriptions refer to the preferred embodiments of the present disclosure. However, those skilled in the art will appreciate that the present disclosure may be variously modified and changed within a scope and spirit of the present disclosure as described in the following claims.

What is claimed is:

1. A method of making a battery, the method comprising:
preparing a porous separator
coating a linker on a surface of the porous separator;
chemically reacting zwitterions with the linker such that the zwitterions are grafted to the linker on the surface of the porous separator,
wherein the zwitterions grafted to the linker acts as a monolayer to functionalize the surface of the porous separator; and,
incorporating the separator into the battery.

2. The method of claim 1, wherein the porous separator includes a polymer separator.

3. The method of claim 1, wherein the porous separator includes an inorganic separator.

4. The method of claim 1, wherein the linker contains an amine group.

5. The method of claim 4, wherein the chemically reacting of the zwitterions with the linker comprises reacting a zwitterionic monomer containing the zwitterions with the linker, and
wherein the zwitterionic monomer containing the zwitterions has a cationic functional group and an anionic functional group at one end thereof and an acrylate functional group at the other end thereof.

6. The method of claim 5, wherein the zwitterionic monomer includes [2-(methacryloyloxy)ethyl]dimethyl-(3-sulfopropyl)ammonium hydroxide or 2-methacryloyloxy-ethyl phosphorylcholine.

7. The method of claim 5, wherein the chemically reacting of the zwitterions with the linker includes formation of a bond via an addition reaction between the amine group of the linker and the acrylate functional group of the zwitterionic monomer.

8. The method of claim 1, wherein the chemically reacting of the zwitterions with the linker comprises reacting a zwitterionic monomer containing the zwitterions with the linker, and
wherein the zwitterionic monomer containing the zwitterions has a cationic functional group and an anionic functional group at one end thereof and an acrylate functional group at the other end thereof.

9. A battery comprising:
a separator manufactured using the method of claim 1, and
wherein the separator is used as a separator for a lithium-sulfur battery,
wherein the zwitterions grafted to the linker act as a monolayer to functionalize the surface of the porous separator.

10. The method of claim 1, wherein the zwitterions grafted monolayer is configured to inhibit elution of polysulfide by electrostatic repulsion.

11. A battery comprising:
a separator having a zwitterionic coating thereon,
wherein the separator includes a porous separator coated with a linker and zwitterions,
wherein the zwitterions are grafted to the linker on a surface of the porous separator, and
wherein the zwitterions grafted to the linker act as a monolayer to functionalize the surface of the porous separator.

12. The battery of claim 11, wherein the porous separator includes a polymer separator.

13. The battery of claim 11, wherein the porous separator includes an inorganic separator.

14. The battery of claim 11, wherein the linker contains an amine group.

15. The battery of claim 14, wherein in order that the zwitterions are coated on the surface of the porous separator, a zwitterionic monomer containing the zwitterions reacts with the linker coated on the surface of the porous separator, and
wherein the zwitterionic monomer containing the zwitterions has a cationic functional group and an anionic functional group at one end thereof and an acrylate functional group at the other end thereof.

16. The battery of claim 15, wherein the zwitterionic monomer includes [2-(methacryloyloxy)ethyl]dimethyl-(3-sulfopropyl)ammonium hydroxide or 2-methacryloyloxy-ethyl phosphorylcholine.

17. The battery of claim 15, wherein when the zwitterionic monomer containing the zwitterions reacts with the linker coated on the surface of the porous separator, a bond is formed via an addition reaction between the amine group of the linker and the acrylate functional group of the zwitterionic monomer, such that the zwitterions are grafted onto the linker.

18. The battery of claim 11, wherein in order that the zwitterions are coated on the surface of the porous separator, a zwitterionic monomer containing the zwitterions reacts with the surface of the porous separator, and
wherein the zwitterionic monomer containing the zwitterions has a cationic functional group and an anionic functional group at one end thereof and an acrylate functional group at the other end thereof.

19. The battery of claim 11, wherein the functionalized battery separator is used as a separator for a lithium-sulfur battery.

20. The battery of claim 11, wherein the zwitterions grafted monolayer is formed in
direct contact with the porous separator, and the monolayer is configured to inhibit elution of polysulfide across the porous separator and to dissociate ions due to the dielectric constant of the zwitterions when placed in a lithium-sulfur battery.

21. A battery comprising:
a separator having a zwitterionic coating thereon,
wherein the separator includes a porous separator coated with zwitterions, and
wherein the zwitterions coated on the porous separator act as a monolayer to functionalize a surface of the porous separator to inhibit elution of an anionic compound across the porous separator by electrostatic repulsion.

22. The battery of claim 21, wherein the porous separator comprises
a polyolefin-based separator or a glass fiber separator, and the monolayer is formed in direct contact with the porous separator.

* * * * *